United States Patent [19]
Stanley et al.

[11] Patent Number: 5,821,753
[45] Date of Patent: Oct. 13, 1998

[54] METHOD FOR OBTAINING MAGNETIC DIPOLE DENSITY IMAGE DATA OF SUBTERRANEAN OBJECT

[75] Inventors: John Stanley; Jun Zhou, both of Armidale, Australia

[73] Assignee: Geophysical Technology Limited, Sydney, Australia

[21] Appl. No.: 682,609
[22] PCT Filed: Jan. 25, 1996
[86] PCT No.: PCT/AU95/00039
§ 371 Date: Sep. 19, 1996
§ 102(e) Date: Sep. 19, 1996
[87] PCT Pub. No.: WO95/20174
PCT Pub. Date: Jul. 27, 1995

[30] Foreign Application Priority Data

Jan. 25, 1994 [AU] Australia .................. PM3523

[51] Int. Cl.⁶ .................. G01V 3/40; G01V 3/38; G01V 3/08
[52] U.S. Cl. .................. 324/345; 324/326; 364/420
[58] Field of Search .................. 324/326, 331, 324/345, 348–350; 364/420

[56] References Cited

U.S. PATENT DOCUMENTS

| | | | |
|---|---|---|---|
| 3,943,436 | 3/1976 | Pirson et al. | 324/345 |
| 4,095,169 | 6/1978 | Musé | |
| 4,663,593 | 5/1987 | Nekut, Jr. | 324/345 |

FOREIGN PATENT DOCUMENTS

| | | |
|---|---|---|
| 0254325 | 1/1988 | European Pat. Off. |
| 91/19210 | 12/1991 | WIPO |

OTHER PUBLICATIONS

Lee et al., Geophysics (USA), vol. 46, No. 5, dated May 1981, pp. 796–805.

McFee et al., IEEE Transactions on Geoscience and Remote Sensing (USA), vol. GE24, No. 5, Sep. 1986, pp. 663–673.

*Primary Examiner*—Gerard R. Strecker
*Attorney, Agent, or Firm*—Rothwell, Figg, Ernst & Kurz

[57] ABSTRACT

A method of processing magnetic field measurements to obtain magnetic dipole density image data is provided. The process involves making measurements of total magnetic field at a plurality of locations over an area of interest, dividing the area of interest into a plurality of narrow parallel strips, performing a strip integral and forming and solving a system of linear equations to obtain a generalized projection. The process is then repeated to produce a plurality of generalized projections from the original measured data by performing strip integrals for a plurality of different orientations of the strips. The process is then completed by performing an inverse Radon transformation on the generalized projections to obtain the magnetic dipole moment density image data.

7 Claims, 6 Drawing Sheets

METHOD FOR OBTAINING MAGNETIC DIPOLE DENSITY IMAGE DATA OF SUBTERRANEAN OBJECT

FIELD OF THE INVENTION

This invention relates to the analysis of subterranean objects and, more particularly, to the determination of properties of subterranean objects by using principles of computerised tomography to interpret magnetic anomaly data associated with those objects.

BACKGROUND OF THE INVENTION

Magnetic surveying is a well-established method of conducting geophysical exploration based on detecting anomalies in the Earth's magnetic field. A limitation of this method at present is that it is difficult to use wish three dimensional modelling in order to obtain vertical geological sections or profiles from measured magnetic anomaly field data. In the past, efforts have been made to derive automatic methods for interpretation of the magnetic or potential anomaly profiles, but the most widely used methods at present are still various trial-and-error methods which require good a priori knowledge concerning the object being analyzed.

In the specification, natural numbers in brackets refer to the list of references at the end of the specification. Suppose that there is a buried two-dimensional magnetic source body of area S with constant magnetic dipole moment per unit area $\vec{M}$ whose direction is determined by its direction cosines $P=\cos\alpha$ and $Q=\cos\beta$ where $\alpha$ is $\vec{M}$'s angle from the (horizontal) x-axis and $\beta$ is $\vec{M}$'s angle from the (vertical) z-axis. The Earth's magnetic field is measured along a line parallel to the X-axis at elevation $z_0$ above the Earth's surface. Suppose also that the direction of the total magnetic field at measuring point $(x',z_0)$ is a unit vector $\vec{t}$ whose direction cosines are $p=\cos\alpha'$ and $q=\cos\beta'$. Then the total magnetic field measured by a magnetometer at point: $(x',z_0)$ can be expressed as [1,2].

$$b_a(x',z_0) = -\vec{t} \cdot \nabla G(x',z_0,x,z) \tag{1}$$

The subscript a denotes that the field intensity mentioned here is the net anomaly field of the source body and (x,z) are the coordinates of a point within the source body. The gradient operator E is defined as $$\nabla = \frac{\partial}{\partial x} \vec{i} + \frac{\partial}{\partial z} \vec{j}$$

where i and j are unit vectors in the directions of the x and z axes, and $G(x',z_0,x,z)$ is the so-called magnetic scalar potential which is defined as $$G(x',z_0,x,z) = -\int\int_S \vec{M} \cdot \nabla\left(\frac{1}{r}\right) dxdz$$

where $$r = \sqrt{(x-x')^2 + (z-z_0)^2} \;.$$

Since $$\vec{M} \cdot \nabla = M\left(P\frac{\partial}{\partial x} + Q\frac{\partial}{\partial z}\right),$$

where M is the magnitude of vector $\vec{M}$, we have $$G(x',z_0,x,z) = \int\int_S \frac{M}{r^3}[P(x-x') + Q(z-z_0)]dxdz. \tag{2}$$

Similarly, because $$\vec{t} \cdot \nabla = p\frac{\partial}{\partial x} + q\frac{\partial}{\partial z}$$

equation (1) becomes $$b_a(x',z_0) = \int\int_S K(x',z_0,x,z)M dxdz \tag{3}$$

where K is the data kernel defined as $$K(x',z_0,x,z) = \left\{ \frac{3[P(x-x') + Q(z-z_0)][p(x-x') + 1(z-z_0)]}{[(x-x')^2 + (z-z_0)^2]^{5/2}} - \frac{pP + qQ}{[(x-x')^2 + (z-z_0)^2]^{3/2}} \right\} \tag{4}$$

Here, P, Q, p and q are considered as constants. Modern magnetometers, such as three-component magnetometers and differential vector magnetometers, can provide information about these parameters. Thus, the data kernel can be considered to be a known function.

The interpretation task is to solve equation (3) to find M and to determine the boundary of S from the measured field data. From the point of view of image processing, this interpretation task is to reconstruct, from the measured signal, a magnetic dipole density distribution function which describes the source body.

If there is a priori knowledge about the shape of the boundary, the location, and the value of M for the source body, then the interpretation can be accomplished in a straightforward manner using least squares curve fitting. This is the principle of various trial-and-error strategies where the a priori knowledge may either come from well-log data or the interpreter's guess work.

Without good a priori knowledge, an hypothesis that is often adopted is that the boundary of S is contained in an area of interest S'(i.e., S⊂S') with a new distribution function defined as [3].

$$w(x,z) = \begin{cases} M & \text{if}(x,z)\in S \\ 0 & \text{otherwise} \end{cases} \tag{5}$$

Therefore the governing formula for the interpretation of the magnetic anomaly profile becomes $$b_a(x',z_0) = \int\int_{S'} K(x',z_0,x,z)w(x,z)dxdz \tag{6}$$

Equation (6) is a Fredholm integral equation of the first kind, and is an ill-posed problem in the sense of Hadamard's standard [4]. If the distribution function w(x,z) could be reconstructed by solving the integral equation then the interpretation of magnetic anomaly profile is accomplished or, in other words, the image of the source body is reconstructed from the measured signal.

Since the real data are measured at discrete points $(x',z_0)$ rather than continuously for all values of x', one method of solving equation (6) is to convert it into a system of linear equations of the form $$Ay = b \quad (7)$$

where A is an m×n matrix and y and b are n×1 and m×1 vectors, respectively. There are many numerical quadrature schemes available for approximating an integral equation as a system of linear equations [5,6]. However, mid-point quadrature has been found [9] to be a good scheme for ill-posed Fredholm integrals of the first kind. Examples which adopt such a quadrature scheme in geophysical inversion problems are discussed in references [7,8]. One such method is Green's strategy [7]. To use Green's strategy for converting equation (6) into a linear system of equations, suppose that the area of interest S' is a rectangle given by the Cartesian product $$S' = (b-a) \times (d-c) \quad (8)$$

where (b−a) is the length of S' and (d−c) is the width. Divide S' into JK pixels, each of length $\Delta x$ and width $\Delta z$, where $$\Delta x = (b-a)/J, \text{ and } \Delta z = (d-c)/K.$$

Then the coordinates of the centre of pixel (j,k) are $$x_j = (j-\tfrac{1}{2})\Delta x;\ j=1,2\ldots,J$$

and $$z_k = (k-\tfrac{1}{2})\Delta z;\ k=1,2,\ldots,K$$

For simplicity, assume that the direction cosines of $\vec{M}$ and t are P=p=0 and Q=q=1. The mid-point quadrature then defines the discrete kernel function as $$K_{ij}(x',z_0,x_j,z_k) = \frac{2(z_k-z_0)^2 + (x_j-x')^2}{[(x_j-x')^2 + (z_k-z_0)^2]^{5/2}}.$$

With a finite number of measuring points, equation (6) becomes $$b_a(x_i,z_0) = \sum_{j=1}^{J}\sum_{k=1}^{K} A_{ijk}w_{jk};\ i=1,2,\ldots,N \quad (9)$$

where N is the number of measuring points, $A_{ijk}$ is given by $$A_{ijk} = \frac{2(z_{k0}-z_0)^2 + (x_j-x_i)^2}{[(x_j-x_i)^2 + (z_k-z_0)^2]^{5/2}} \Delta x \Delta z$$

and $w_{jk}$ is a constant within a pixel but may change from pixel to pixel. In terms of matrices equation (9) can be rewritten as $$Aw = b_a \quad (10)$$

where A is a (N×JK) matrix and w and $b_a$ are JK and N vectors, respectively.

Now the governing formula (6) has been converted into the system of linear equations (10). This linear system, from the point of view of inversion theory, serves as the forward model in discrete form.

Unfortunately, it can be shown that matrix A is ill-conditioned. Therefore, it is difficult to obtain an accurate estimate of W even if very accurate measurements $b_a$ are available.

Further, if the number of pixels is increased in an attempt to obtain better accuracy, A becomes even more ill-conditioned. Yet further, A is a large dense matrix, so computing w from (10) is computationally intense, and thus the strategy for solving equation (6) by dividing the area of interest into pixels is not optimal. Therefore, in the following, we describe a method based on computerised tomography that reduces some of these problems of finding the boundary of S.

SUMMARY OF THE INVENTION

The present invention consists in a method for obtaining magnetic dipole density image data concerning a subterranean object S contained in an area of interest S', the object having properties that cause a total magnetic field comprising a vector sum of the Earth's magnetic field and an anomaly, the method comprising the steps of:

measuring the total magnetic field at a plurality of locations in a vicinity of the object to obtain a plurality of magnetic field observations;

dividing the area of interest S' into a set of narrow parallel strips, all of which are perpendicular to a direction which is specified by an angle θ; relative to a primary axis of a reference coordinate system;

computing a strip integral of the plurality of magnetic field observations for each one of the plurality of locations;

forming and solving a system of linear equations using the strip integrals to obtain a generalised projection;

repeating the above three steps for different angles θ, where the values of θ are evenly distributed within the range of 0, π;

performing an inverse Radon transformation on the generalised projections to obtain the magnetic dipole moment density image data concerning the object.

A representation of the magnetic dipole moment density image data may then be displayed in any suitable format.

Preferably, the strip integral $a_{ik}$ is computed according to $$a_{ik} = \int\!\!\int_{S'_k} K(x_i,z_0,x,z)w'dxdz$$

where i denotes a location index, k denotes a strip index, $S'_k$ is the kth strip of an area of interest, $K(x_i,z_o,x,z)$ is a known kernel function, $x_i$ is the ith location, $z_o$ is the height of the plurality of locations, and w' is a constant substantially equal to a magnetic dipole moment per unit area of the object.

Preferably, the step of forming and solving the set of linear equations further comprises the steps of:

forming a first intermediate system of linear equations of the form Ya=b where Y is an unknown matrix, a is a vector obtained form the strip integrals, and b is a vector formed from the plurality of magnetic field observations; and converting the first intermediate system of linear equations into a second intermediate system of linear equations of the form $A^*y_i=b_i$ where A is a matrix of coefficients obtained from the first intermediate system of linear equations, $y_i$ is the ith row of the unknown matrix Y, and $b_i$ is a vector formed from the total magnetic field.

Preferably, the step of solving the second intermediate system of linear equations uses a regularization method.

BRIEF DESCRIPTION OF THE DRAWINGS

The invention will now be described with reference to the accompanying drawings in which.

DETAILED DESCRIPTION OF THE INVENTION

Figure 1B:
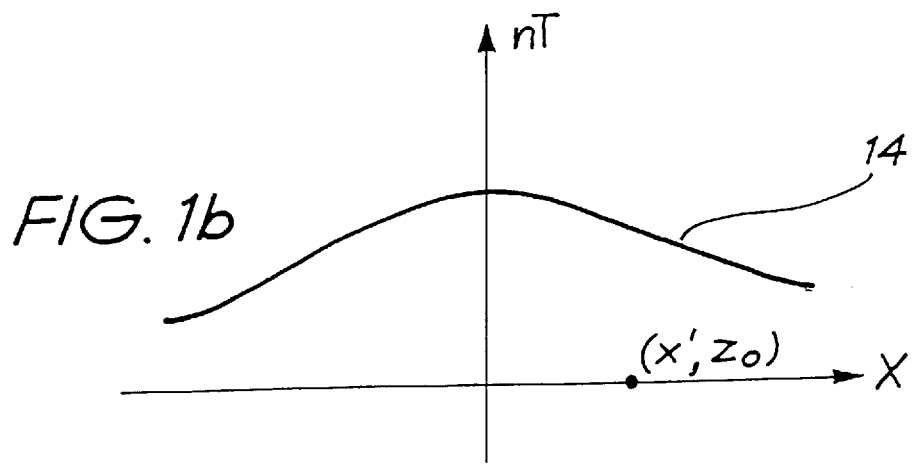
FIG. 1b is a graph representing the measured magnetic field in the vicinity of the subterranean object, the measured field being caused by the object's distortion of the Earth's magnetic field.

As described above, the task at hand is to reconstruct a magnetic dipole density image of the cross section of S' from which the boundary of S can be determined. The following describes a method for accomplishing this task using techniques related to computerised tomography.

Computerised tomography (CT) and tomographic image reconstruction techniques provide a well-defined automatic method for three-dimensional modelling using anomaly data. Such techniques have been extensively studied and developed for applications in medicine and in some forms of non-destructive testing. They have also been used for seismic data processing in the petroleum industry, and for studying hidden or buried objects.

Briefly, computerised tomography relates to the reconstruction of an unknown function from line integrals. In particular, it relies upon the property that an unknown function $f$ in a region S' can be uniquely reconstructed from line integrals of $f$ taken along all directions through S'.

Generally speaking, modern CT methods are applicable to imaging situations where line integrals or strip integrals of a parameter, such as X-ray attenuation in medical imaging or wave slowness in seismic tomography, are available as collected data.

To define the operation of computerised tomography more precisely, consider a plane in two dimensions in which any point can be represented in terms of its Cartesian coordinates x and y, or its polar coordinates $\tau$ and $\phi$. For an arbitrary straight line in the plane, let $\phi$ denote the angle between the X-axis and the direction normal to the line, and let $\tau$ denote the signed perpendicular distance from the origin to the line. The line can then be described by the equation $$x\cos\theta + y\sin\theta = \tau \quad (11)$$

Let $F(\tau,\theta)$ be the Radon transform [11], line integral, or projection of $f(x,y)$. Then $f$ in polar coordinates can be reconstructed uniquely from $F(\tau,\theta)$ by the inverse transformation $$f(\eta,\phi) = \frac{1}{2\pi^2} \int_0^\pi \int_{-\infty}^\infty \frac{F_1(\tau,\theta)}{r\cos(\theta-\phi)-\tau} d\theta d\tau \quad (12)$$

where $F_1(\tau,\theta)$ is the partial derivative of $F(\tau,\theta)$ with respect to $\tau$.

In practice, $F(\tau,\theta)$ is only known at discrete points along lines, i.e., for $\tau=\tau_k=k\eta$ for nonnegative integer values of k, and $\theta=\theta_j=j\pi/N$; $j=0,1,2\ldots,N-1$. Here, each value of θ defines one of N views taken around a semicircle surrounding the object, and η is the separation between two adjacent parallel lines in each view.

Hence, in practical implementations, the integrals in equation (12) are replaced by summations to obtain an approximate reconstruction formula for $f_\xi$, depending on $\xi$, given by $$f_\xi(x,y) = \frac{\eta\Delta\theta}{2\pi} \sum_{j=0}^{N-1} \sum_{k=1}^{L} F(\tau_k,\theta_j)\xi(x\cos\theta_j + y\cos\theta_j - \tau_k). \quad (13)$$

Here, $\Delta\theta$ is the angle between two adjacent views, $\xi$ is a filter function introduced by regularisation related to approximation theory and L is the number of line integrals within a view. It can be shown [13] that L and N are related optimally by the expression L=N/π. Image reconstructing techniques based on equation (13) are known to as back projection methods.

Now apply the principles of computerised tomography to the anomaly interpretation task at hand. FIG. 1a illustrates a schematic cross-section of object 10 beneath Earth's surface 12. Object 10 is contained within area of interest S'. As shown in FIG. 1a, an X-axis is defined to be oriented parallel to the Earth's surface, and a Z-axis is defined to be oriented vertically. Object 10 has a magnetic dipole moment density $\vec{M}$ whose direction is defined by its direction cosines P=cosα and Q=cosβ where α is $\vec{M}$'s angle from the x-axis and β is $\vec{M}$'s angle from the z-axis.

Figure 1A:
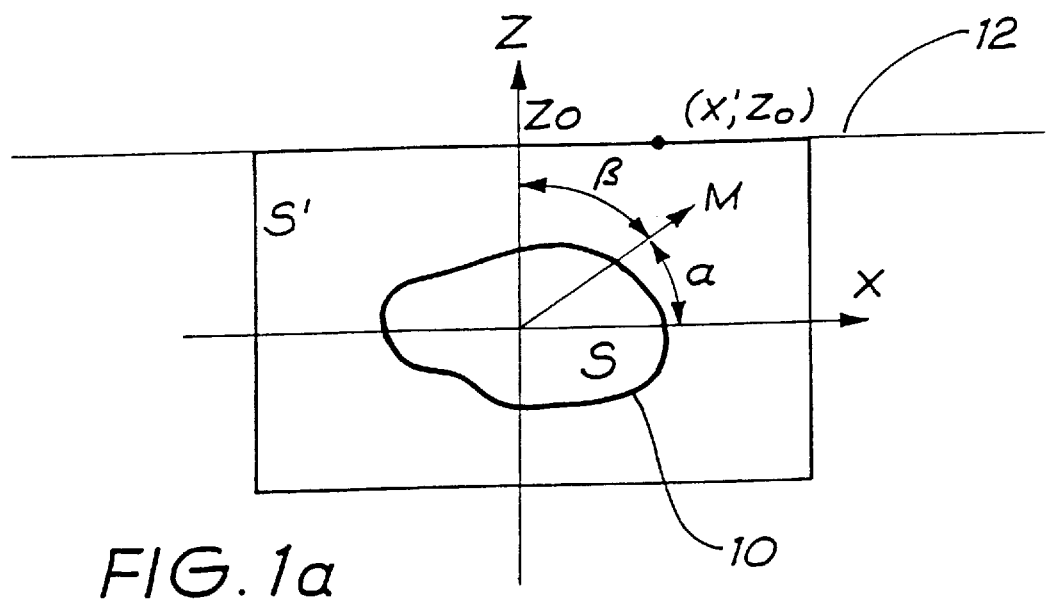
FIG. 1a is a schematic cross-sectional representation of a subterranean object S contained in an area of interest S'.

The Earth's magnetic field is measured along a line parallel to the X-axis at elevation $z_o$ above the Earth's surface giving an anomaly as illustrated by curve 14 in FIG. 1b.

Figure 2:
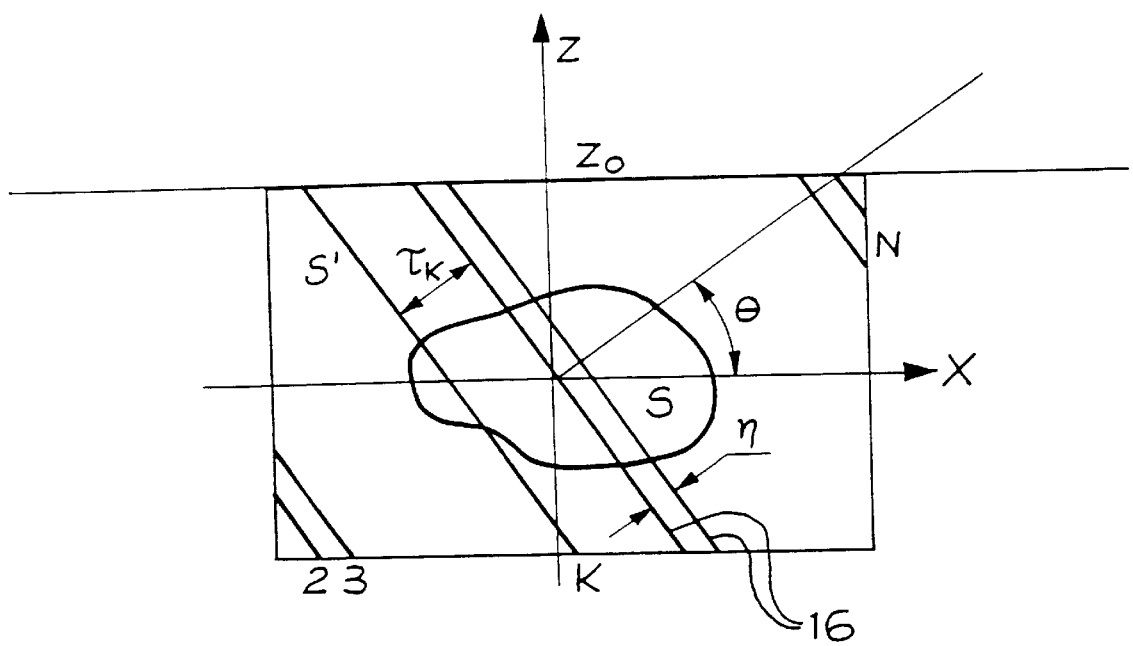
FIG. 2 illustrates how an area of interest and a subterranean object is partitioned into strips perpendicular to a direction specified by an angle θ.

To apply the principles of computerised tomography, instead of dividing the area of interest S' directly into a number of pixels as is conventionally done, divide it into a number of narrow strips as shown in FIG. 2. For a given angle θ with respect to the X-axis, draw parallel lines 16 with the same interval η between two adjacent lines, drawn parallel lines being normal to all lines making an angle θ with the x-axis such that they can all be described by equation (11). Let the area between two adjacent lines define a strip. Then η is the width of the strips, and is chosen (to ensure that a desired spatial resolution is obtained in the reconstructed image [10]) such that $\eta \leq \min(\delta x, \delta z)$, where δxδz is the size of a pixel to be produced in the reconstructed.

Let $S'_k$ denote the area of the kth strip, and let $\Delta_k$ denote the intersection of the source body S with $S'_k$ (i.e. $\Delta_k = S'_k \cap S$). Then $$t_{ik} = \int\int_{\Delta_k} K(x_i, z_0, x, z)\omega(x,z)dxdz; \ i=1,2,\ldots,N \quad (14)$$

where $t_{ik}$ represents the contribution of the source body from the kth strip to the measured field intensity at the ith measuring point, and N is the total number of measuring points. It follows that $$b_a(i) = \sum_{k=1}^N t_{ik}; \ i=1,2,\ldots,N \quad (15)$$

where N is the total number of the strips. (For the sake of simplicity we set the number of strips equal to the number of measuring points).

Let $a_{ik}$ denote the strip integral $$a_{ik} = \int\int_{S'_k} K(x_i, z_0, x, z) w' dx dz \quad i = 1, 2, \ldots, N \quad (16)$$

where w' is a constant and w'≈M

Since $a_{ik}$ and $t_{ik}$ are numbers, it will always be true that $$t_{ik} = y_{ik} a_{ik} = y_{ik} a_k \quad (17)$$

where $y_{ik}$ is an unknown real number and $a_k = a_{kk}$.

Substituting equation (17) into equation (15) results in $$b_a(i) \sum_{k=1}^{N} y_{ik} a_{ik}; \; i = 1, 2, \ldots, N. \quad (18)$$

This can be written in the matrix form $$Ya = b \quad (19)$$

where $$Y = \begin{pmatrix} y_{11} & y_{12} & \ldots & y_{1n} \\ y_{21} & y_{22} & \ldots & y_{2n} \\ \cdot & \cdot & & \cdot \\ \cdot & \cdot & & \cdot \\ \cdot & \cdot & & \cdot \\ y_{n1} & y_{n2} & \ldots & y_{nn} \end{pmatrix}, a = \begin{pmatrix} a_1 \\ a_2 \\ \cdot \\ \cdot \\ \cdot \\ a_n \end{pmatrix}, b = \begin{pmatrix} b_1 \\ b_2 \\ \cdot \\ \cdot \\ \cdot \\ b_n \end{pmatrix}, \quad (20)$$

and, for consistency, the field intensity $b_a(i)$ is denoted by $b_i$.

We now have a system of linear equations (19) in which the unknown is the matrix Y. Unlike equation (10), this system theoretically has no approximation error (ignoring round off errors) because it is not a discrete form of a Fredholm integral of the first kind.

If the ith row of Y is computed from equation (19) then, according to (18), the contribution of the source body to the ith measuring point from the kth strip is simply $t_{ik} = y_{ik} a_k$. It is then possible to determine the contribution of the source body from all of these strips.

Defining an image function as $$f(x,z) = K(x_i, z_0, x, z) w(x, z); \; (x, z) \in S' \quad (21)$$

it is evident that $$y_{ik} a_{ik} = \int\int_{S'_k} f(x, z) dx dz. \quad (22)$$

That is, that $y_{ik} a_k$ is the strip integral of the image function $f(x, z)$, and we refer to it as the generalised Radon transform. Since all of these strips are divided in parallel in a direction specified by the angle $\theta$, the set $\{y_{ik} a_k | k=1, 2, \ldots, N\}$ can be considered to be a projection of an image function $f(x, z)$ according to the definition used in computerised tomography as described above.

For each value of $\theta$, there is a set of strips and a corresponding projection of the image function as defined in equation (21). Construct and solve a system of linear equations for each value of $\theta$ given by $\theta_j = j\pi/N$, $j = 0, 1, \ldots, N-1$ to produce N projections of the image function $f(x, z)$ along N directions. With these N projections the image $f(x, z)$ is readily reconstructed through the back projection method of equation (13). Once the image $f(x, z)$ is reconstructed, it is possible to find the distribution function $w(x, z)$, since the data kernel $K(x_i, z_o, x, z)$ is known.

Recall from its definition in equation (4) that the data kernel is considered to be a function of the argument $(x', z_0, x, z)$, while P, Q, p and q are all considered as constants. For a given source body, P and Q are, indeed, constants. However, p and q, the directional cosines of the unit vector $\bar{t}$, are variable; when $\bar{t}$ is parallel to the total magnetic field intensity, the measured magnetic field data is the magnitude of the total magnetic field intensity, otherwise the data is the component of the total field in the direction of $\bar{t}$. Since p and q satisfy $$p^2 + q^2 = 1, \quad (23)$$

the data kernel K can be considered to be a function of the extended argument $(x', z_0, x, z, p)$. That is $$K(x', z_0, x, z, p) = \quad (24)$$

$$\frac{3[P(x-x') + Q(z-z_0)][p(x-x') + \sqrt{1-p^2}\,(z-z_0)]}{[(x-x')^2 + (z-z_0)^2]^{5/2}} -$$

$$\frac{pP + \sqrt{1-p^2}\,Q}{[(x-x')^2 + (z-z_0)^2]^{3/2}}$$

For a given direction $\bar{t}_j$, (i.e., given $p_j$) define vector $a^j$ as $$a^j = [a_1^j, \ldots, a_k^j, \ldots, a_n^j]^T \quad (25)$$

where the elements $a_k^j$ are computed using $$a_k^j = \int\int_{S'_k} K(x_k, z_0, x, z, p_j) w' dx dz \text{ for } k = 1, 2, \ldots, N. \quad (26)$$

For a given $p_j$, denote the measured anomaly field data (a component of the total field in the direction of $\bar{t}_j$) by the vector $b^j$ which is defined as $$b^j = [b_1^j, b_2^j, \ldots, b_n^j]^T \quad (27)$$

Then one has $$Ya^j = b^j; \; j = 1, 2, \ldots, n. \quad (28)$$

Defining the (n×n) matrices A and B by juxtaposing vectors as follows $$A = (a^1 \; a^2 \; \ldots \; a^n), B = (b^1 \; b^2 \; \ldots \; b^n) \quad (29)$$

enables equation (28) to be written as $$YA = B. \quad (30)$$

Equation (30) has a unique solution if A is a non-singular or, equivalently, if the vector set $\{a^j | j = 1, 2, \ldots, n\}$ is a linearly independent set. From the definition of $a^j$, it is clear that the linearity of this vector set is determined by the linearity of the data kernel $K(x_k, z_o, x, z, p_j)$ with respect to the variable $p_j$. However, $K(x_k, z_o, x, z, p_j)$ is a nonlinear function of p because, from (23), $q = \sqrt{1-p^2}$. Therefore, $a^1, a^2, \ldots, a^n$ are linearly independent vectors, A is non-singular, and (30) has a unique solution given by $$Y = BA^{-1} \quad (31)$$

where $A^{-1}$ denotes the inverse of A.

It was indicated before that only one row of the solution matrix is required. If one transposes equation (30) and multiplies the transposed matrix equation by the vector $e_i$ where $e_i$ is an n-dimensional vector with a one in its ith position and zeros elsewhere, then one has $$A^* Y^* e_i = B^* e_i \quad (33)$$

which gives $$y_i = (A^*)^{-1} b_i \qquad (34)$$

where $y_i$ is the ith row of the unknown matrix Y and $b_i$ is the ith row of the matrix B.

If we rewrite equation (30) explicitly as $$Y = \begin{bmatrix} y_{11} & y_{12} & \cdots & y_{1n} \\ y_{21} & y_{22} & \cdots & y_{2n} \\ \cdot & \cdot & & \cdot \\ \cdot & \cdot & & \cdot \\ \cdot & \cdot & & \cdot \\ y_{n1} & y_{n2} & \cdots & y_{nn} \end{bmatrix} \begin{bmatrix} a_1^1 & a_1^2 & \cdots & a_1^n \\ a_2^1 & a_2^2 & \cdots & a_2^n \\ \cdot & \cdot & & \cdot \\ \cdot & \cdot & & \cdot \\ \cdot & \cdot & & \cdot \\ a_n^1 & a_n^2 & \cdots & a_n^n \end{bmatrix} = \begin{bmatrix} b_1^1 & b_1^2 & \cdots & b_1^n \\ b_2^1 & b_2^2 & \cdots & b_2^n \\ \cdot & \cdot & & \cdot \\ \cdot & \cdot & & \cdot \\ \cdot & \cdot & & \cdot \\ b_n^1 & b_n^2 & \cdots & b_n^n \end{bmatrix} \qquad (29)$$

then we can see that the elements of $b_i$, the ith row of the matrix B, are the components in the direction $p_j$ of the total field intensity measured at the same point. That is $$b_i = \lfloor b_i^1, b_i^2, b_i^j, \ldots, b_i^n \rfloor \qquad (36)$$

Figure 3:
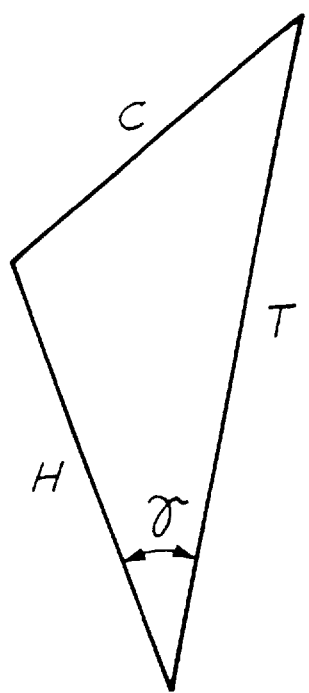
FIG. 3 illustrates a vector summation of the Earth's magnetic field and an anomaly field to produce a total field.

The problem that arises here is how to obtain the vector sets $\{a^j|j=1,2,\ldots,n\}$ and $\{b^j|_{j=1,2,\ldots,n}\}$ in practice. The magnetic field intensity measured by most modern three-component magnetometers is that produced by vector summation of the Earth's main field and the anomaly field introduced by the magnetic body. This vector summation is shown schematically in FIG. 3 where H represents the Earth's main field, C represents the anomaly field, T represents the total field measured by the magnetometer, and γ is the angle between H and T. The Earth's main field at a surveying point can reasonably be considered to be a known constant. Thus, the anomaly field C can be obtained simply from $$C = T - H \qquad (37)$$

Once C is computed, one can find $$p_1 = \cos\alpha' \qquad (38)$$

where α' is the angle between C and the x-axis. Let $$b_i^1 = b_i \qquad (39)$$

where $b_i$ is the magnitude of C. We have $$p_j = \alpha + (j-1)\Delta\alpha \qquad (40)$$

where Δα is the difference between angles $p_j$ and $p_{j+1}$ and (j−1)Δα is the biasing angle of the $p_j$ from $p_1$. It follows that $$b_i^j = b_i^1 \cos[(j-1)\Delta\alpha]. \qquad (41)$$

Therefore, $b_i$ can be obtained from the magnitude of the total field intensity and direction cosines $\cos[(j-1)\Delta\alpha]$ at the measuring point $(x_i, z_o)$. By substituting $\{p_j|j=1,2,\ldots,n\}$ into equation (24), the vector set $\{a^j|j=1,2,\ldots,n\}$ defined in equation (25) is readily obtained by equation (26).

The problem has now been reduced to that of solving an ordinary system of linear equations (34). However, the vector set $\{a^j|j=1,2\ldots,n\}$ may be far from orthogonal, even though it is linearly independent. Therefore, A may be ill-conditioned or rank deficient. Thus, standard methods of linear algebra for solving (34), such as LU, Cholesky, or QR factorization, may not be reliable if one uses them in a straightforward manner to compute the solution to the problem.

The most common methods used to solve systems of linear equations involving ill-conditioned matrices are regularization methods. The simplest of these is the so-called damped least squares method in the Marquardt-Levenberg's formulation $$y = (A^*A + \lambda I)^{-1} A^* b \qquad (42)$$

where λ is a damping factor or regularization parameter, and I is the identity matrix. An important issue in the use of this method is the choice of an optimal λ, and the generalised cross validation (GCV) method is commonly used for this purpose [12]. Quite often, the GCV method fails to find an optimal λ, and there now exists a more powerful L-curve method for choosing an optimal λ.

Figure 4:
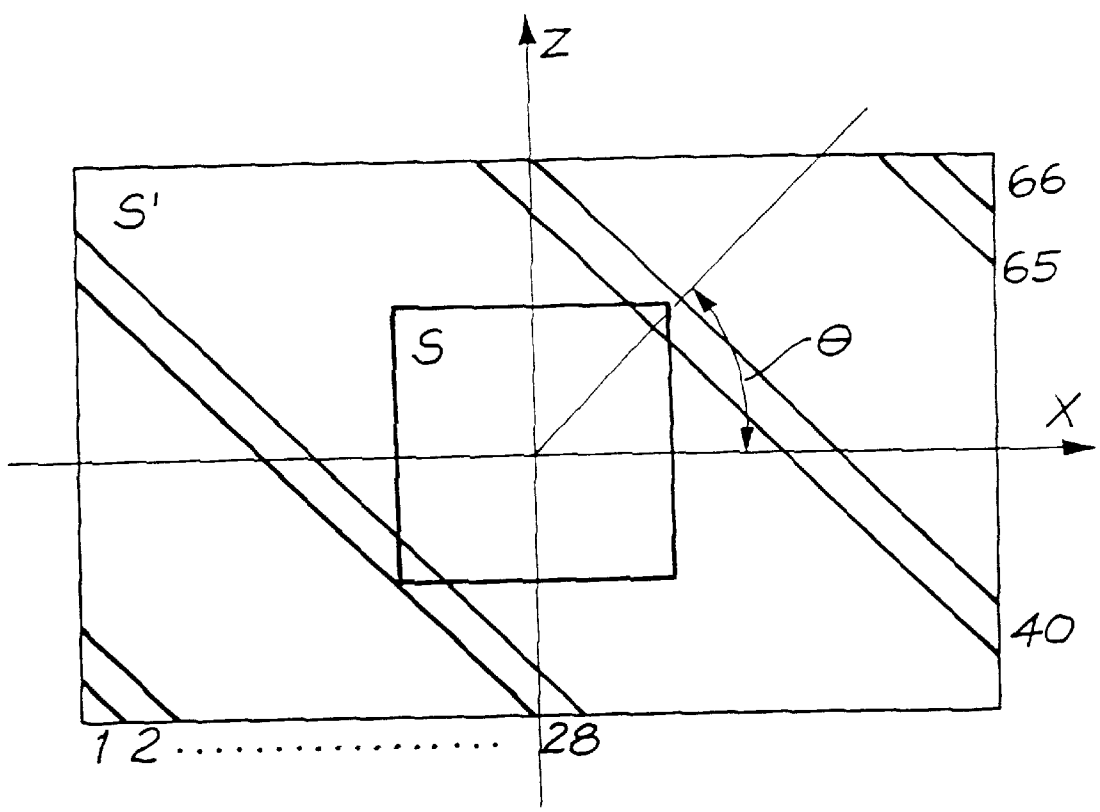
FIG. 4 is a schematic cross-sectional representation of a subterranean object in an area of interest, illustrating how the area of interest in an example is divided into strips.

The following describes a numerical example that illustrates the use of the method for interpreting magnetic anomaly profiles. The object considered here is a square object S within area of interest S' as shown in FIG. 4. The labels 1,2, ..., 28, ..., 66 surrounding area of interest S' refer to strip numbers within S'. The dimensions of the pixels were set at δx×δz=0.5m×0.5m. The total number, N, of pixels within area of interest S' is 61×21=1281. This requires S' to be divided into 66 strips for a given angle θ and the total number of views is set to be 33. For the chosen object, with strips in a direction θ≈54.5°, only strips 28 to 40 intersect with the object, as shown in FIG. 4.

Figure 5:
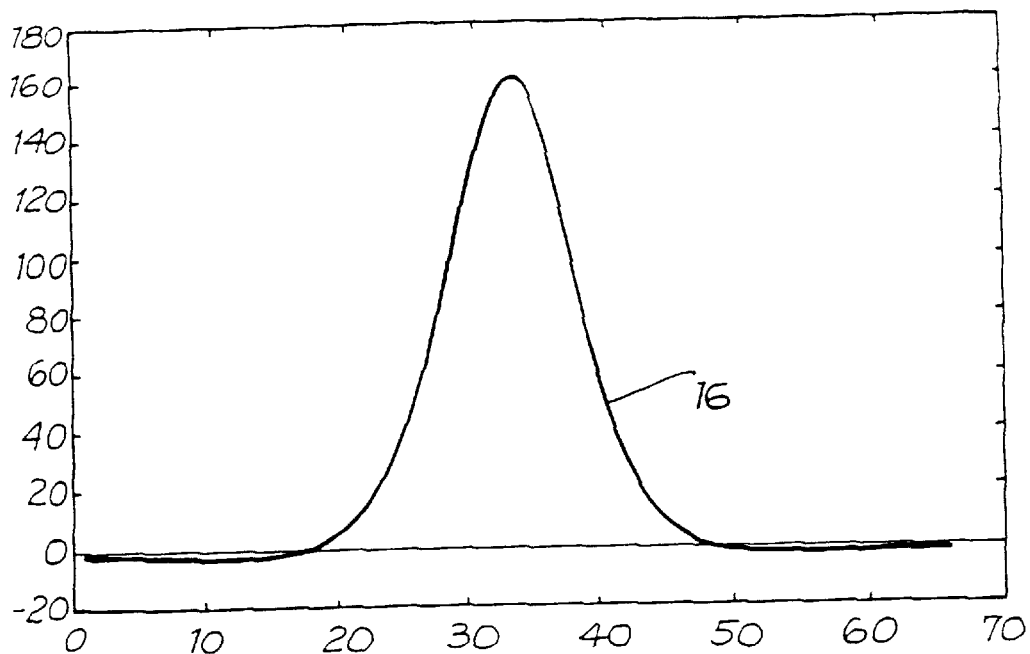
FIG. 5 is a graph of simulated magnetic field density for the example of FIG. 4.

Measurements were simulated at an elevation $z_o$=0.5m above the surface of the Earth using equation (3). This simulated anomaly field data is shown as line 16 in FIG. 5, where the simulated magnetic field measurements are plotted against the strip number. The subscript i in equation (39) was chosen to be i=32. Random errors $\delta_i$ were added to this perfect data to give $b_i^1 = b_{32} + \delta_{32}$.

Figure 6:
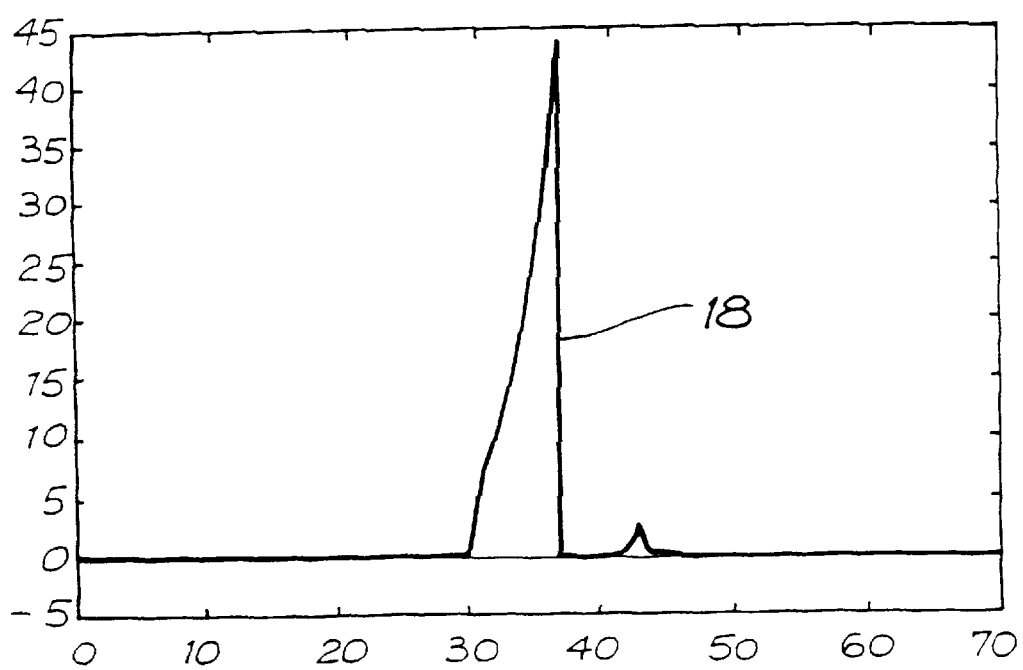
FIG. 6 is a generalised projection computed in accordance with the present invention.

A corresponding projection of the object-related image function as defined in (21) is shown as line 18 in FIG. 6, with a typical λ chosen using the GCV method. In FIG. 6, the projection is a plot of strip integrals of the image function against the strip number, and it can be seen that the strip integrals are significantly different from zero at least for strips 30 to 37.

Figure 7:
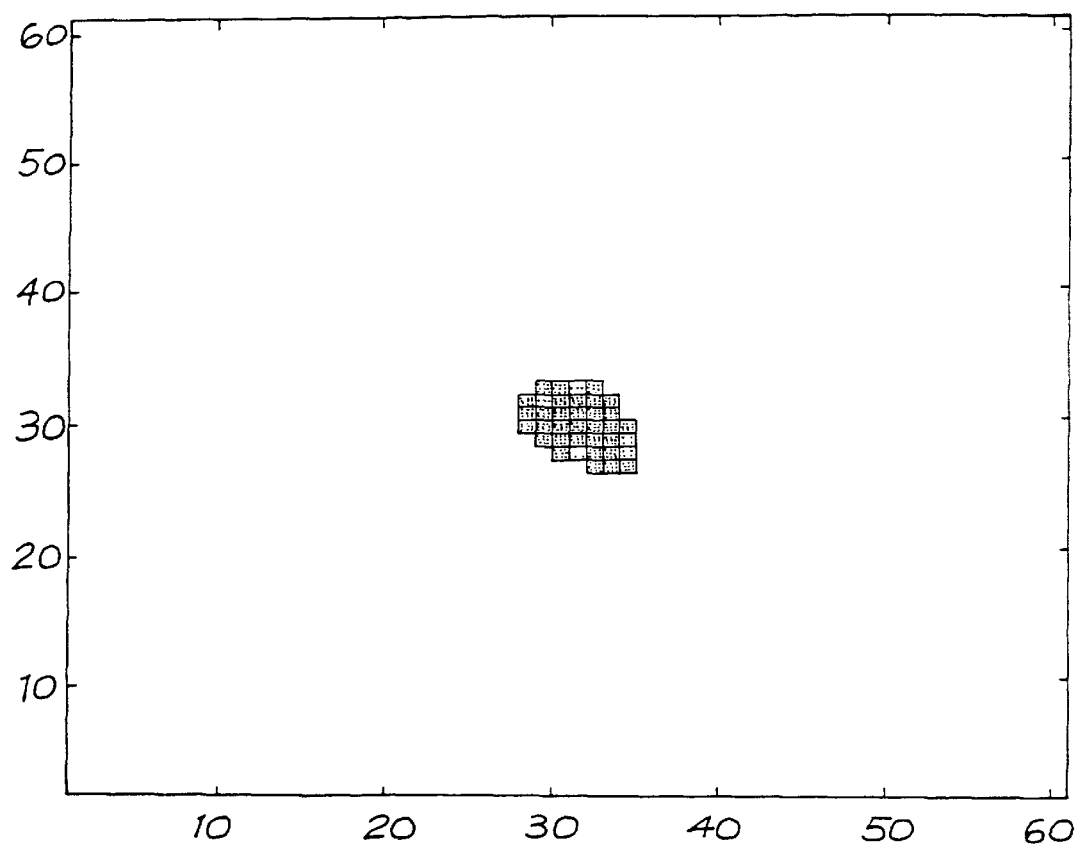
FIG. 7 is the reconstructed image of FIG. 4 using projections in 33 directions in accordance with the present invention.

FIG. 7 shows the reconstructed image function $f(x,z)$ defined in equation (21). This is accomplished by using a back projection algorithm with projections obtained by solving 33 systems of linear equations.

Although in the conventional application of CT methods, the image of an object is obtained from projections directly measured at different angles around. the object, the present invention illustrates how the principles of CT can be used to obtain the image of an object using only the potential field measured on a plane located some distance away from the object.

Some advantages of the method presented here are that: (1) it can find a physically acceptable solution to a Fredholm integral equation of the first kind without any a priori knowledge about the solution, (2) its computational cost is low, and (3) it can be extended easily to three-dimensional problems.

Thus, there has been described a method for interpreting magnetic anomaly profiles. Those skilled in the art will appreciate that various modifications can be made without departing from the scope of the invention as, broadly described, and the embodiment described is presented for purposes of illustration and not limitation.

References

[1] W. M. Telford, L. P. Geldart & R. E. Sheriff, Applied Geophysics, Second Edition, Cambridge University Press, 1990.

[2] B. K. Bhattacharyya; A Generalised Multibody Model for Inversion of Magnetic Anomalies, Geophysics, vol, 45, no. 2, pp. 255–270, 1980.

[3] M. M. Lavrent'ev, V. G. Romanov, & S. P. Shishat-Skii; Ill-posed Problems of Mathematical Physics and Analysis, Translation of Mathematical Monographs, Vol. 64, American Mathematical Society, 1986.

[4] N. Tikjonov & Y. Arsenin; Solutions of Ill-posed Problems, John Wiley & Sons, 1977.

[5] S. Twomey; Introduction to the Mathematics of Inversion in Remote Sensing and Indirect Measurements, Elsevier, 1977.

[6] C. Lanczos; Applied Analysis, Prentice-Hall, Englewood Cliffs, N.J., 1956.

[7] W. R. Green; Inversion of Gravity Profiles by Use of Backus-Gilbert Approach, Geophysics, Vol. 40, No. 5, pp. 763–772, 1975.

[8] C. Safon; Some Applications of Linear Programming to the Inverse Gravity Problem, Geophysics, Vol. 42, pp. 1215–1229.

[9] F. R. de Hoog; Review of Fredholm Equations of the First Kind, in: The Application and Numerical Solution of Integral Equations, ed: R. S. Anderssen et al, Sijthoff & Noordhoff, Netherlands, 1980.

[10] L. A. Sheep & B. F. Logan; The Fourier Reconstruction of a Head Section, IEEE transaction on Nuclear Science, vol. Ns-21, pp. 21–43, June 1977.

[11] G. T. Herman, Image Reconstruction from Projections: The Fundamentals of Computerised Tomography, Academic Press, New York, 1980.

[12] G. H. Golub et al, Generalised Cross-Validation as a Method for Choosing a Good Ridge Parameter, Technometrics, vol. 21, pp. 215–223, 1979.

[13] S. R. Deans, "The Radon Transform and Some of its Applications," John Wiley, New York, 1983.

[14] D. S. Watkins, "Fundamentals of Matrix Computations," John Wiley and Sons, New York, 1991.

We claim:

1. A method for obtaining magnetic dipole density image data concerning a subterranean object S contained in an area of interest S', the object having properties that cause a total magnetic field comprising a vector sum of the Earth's magnetic field and an anomaly, the method comprising the steps of:

(a) measuring the total magnetic field at a plurality of locations in a vicinity of the object to obtain a plurality of magnetic field measurements;

(b) dividing the area of interest S' into a set of narrow parallel strips, all of which are perpendicular to a direction which is specified by an angle θ relative to a primary axis of a reference coordinate system;

(c) for each one of the strips, computing a strip integral, where the strip integral is the integral of magnetic field intensity over the respective strip and is computed from magnetic field measurements made in the respective strip by solving a system of linear equations relating to the magnetic field measurements;

(d) repeating steps (b) and (c) for different angles θ, where the values of θ are evenly distributed within the range of 0 to n;

(e) constructing magnetic dipole density data by performing an inverse Radon transformation on the strip integrals; and (f) displaying a representation of the magnetic dipole density image data.

2. The method of claim 1 wherein the integral $a_{ik}$ of each strip of magnetic field measurements is computed according to $$a_{ik} = \int\int_{S'k} K(x_i, z_0, x, z) w'(x, z) dx dz$$

where i denotes a location index, k denotes a strip index, $S'_k$ is the kth strip of an area of interest, $K(x_i, z_o, x, z)$ is a known kernel function, $x_i$ is the ith location, $z_o$ is the height of the plurality of locations, and w' is a constant substantially equal to a magnetic dipole moment per unit area of the objection.

3. The method of claim 2 wherein the step of forming and solving the set of linear equations further comprises the steps of:

forming a first intermediate system of linear equations of the form Ya=b where Y is an unknown matrix, a is a vector obtained from the integrals of each strip of magnetic field measurements, and b is a vector formed from the plurality of magnetic field measurements; and converting the first intermediate system of linear equations into a second intermediate system of linear equations of the form $A^* y_i = b_i$ where A is a matrix of coefficients obtained from the first intermediate system of linear equations, $y_i$ is the ith row of the unknown matrix Y, and $b_i$ is a vector formed from the total magnetic field.

4. The method of claim 3 wherein the step of solving the second intermediate system of linear equations uses a regularization method.

5. The method according to any one of claims 1, further comprising the step of displaying a representation of the magnetic dipole moment density image data on display means.

6. The method of claim 1 wherein the step of forming and solving the set of linear equations further comprises the steps of:

forming a first intermediate system of linear equations of the form Ya=b where Y is an unknown matrix, a is a vector obtained from the integrals of each strip of magnetic field measurements, and b is a vector formed from the plurality of magnetic field observations; and converting the first intermediate system of linear equations into a second intermediate system of linear equations of the form $A^* y_i = b_i$ where A is a matrix of coefficients obtained from the first intermediate system of linear questions, $y_i$ is the ith row of the unknown matrix Y, and $b_i$ is a vector formed from the total magnetic field.

7. The method of claim 6 wherein the step of solving the second intermediate system of linear equations uses a regularization method.

* * * * *

UNITED STATES PATENT AND TRADEMARK OFFICE
CERTIFICATE OF CORRECTION

PATENT NO. : 5,821,753
DATED : October 13, 1998
INVENTOR(S) : John Stanley et al.

It is certified that error appears in the above-identified patent and that said Letters Patent is hereby corrected as shown below:

On the title page, item[86] "1995" should read --1996--.

Col. 1, line 46, "E" should be

-- $\nabla$ --; Col. 3, line 45 (in the equation), in the numerator, "$z_{k0}$" should be -- $z_k$ --.

Signed and Sealed this

Fifteenth Day of June, 1999

*Attest:*

Q. TODD DICKINSON

*Attesting Officer*   *Acting Commissioner of Patents and Trademarks*

UNITED STATES PATENT AND TRADEMARK OFFICE
CERTIFICATE OF CORRECTION

PATENT NO. : 5,821,753
DATED : October 13, 1998
INVENTOR(S) : John Stanley et al.

It is certified that error appears in the above-indentified patent and that said Letters Patent is hereby corrected as shown below:

On the title page, item [22] should read
--Jan. 25, 1995--.

Column 1, line 46, "E" should be --$\nabla$--.

Column 3, line 45, (in the equation), in the numerator, "$z_{k0}$" should be --$z_k$--.

This certificate supersedes Certificate of Correction issued June 15, 1999.

Signed and Sealed this

Nineteenth Day of October, 1999

*Attest:*

Q. TODD DICKINSON

*Attesting Officer*    *Acting Commissioner of Patents and Trademarks*